United States Patent [19]

Graebner

[11] Patent Number: 5,198,820
[45] Date of Patent: Mar. 30, 1993

[54] CALIBRATING SATELLITE ALTIMETRY MEASUREMENTS OF GEOIDAL HEIGHT

[75] Inventor: Peter Graebner, Conifer, Colo.

[73] Assignee: Chevron Research and Technology Company, San Francisco, Calif.

[21] Appl. No.: 761,552

[22] Filed: Sep. 18, 1991

[51] Int. Cl.5 .......................... G01S 7/40; G01V 13/00
[52] U.S. Cl. ..................................... 342/165; 364/420
[58] Field of Search ................. 342/165, 26, 352, 120; 364/420

[56] References Cited

U.S. PATENT DOCUMENTS

| | | | |
|---|---|---|---|
| 3,888,122 | 6/1975 | Black | 73/382.6 |
| 5,001,634 | 3/1991 | Nordin | 364/420 |
| 5,053,778 | 10/1991 | Imhoff | 342/191 |

Primary Examiner—Gilberto Barrón, Jr.
Attorney, Agent, or Firm—E. A. Schaal; W. K. Turner

[57] ABSTRACT

Satellite-altimetry measurements of ocean water height are calibrated by measuring an ocean water height by using satellite-altimetry at one location during a time period, measuring another ocean water height during the same time period against a known reference on a fixed offshore structure at another location near the first location, and comparing these two sets of measurements. One way of measuring ocean water height against a known reference point on a fixed offshore structure is by measuring the time it takes for pulse of energy to travel from a transmitter at that reference point to the sea surface, and back to a receiver. Another way of measuring ocean water height against a known reference point is by using water-sensitive sensors placed on the fixed offshore structure at known distances from the known reference point.

6 Claims, 1 Drawing Sheet

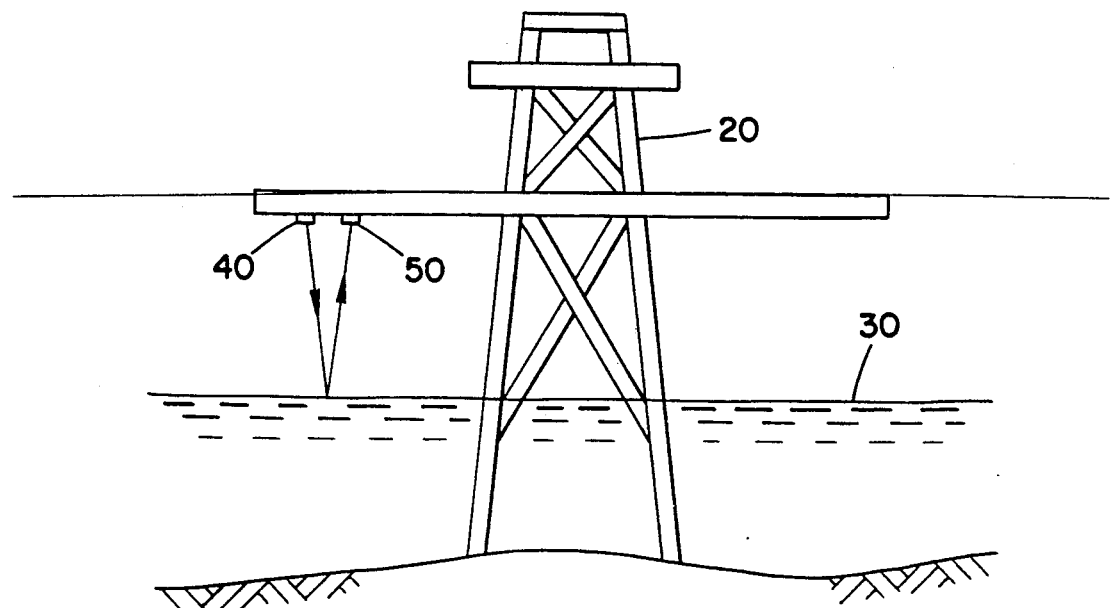
FIG_1
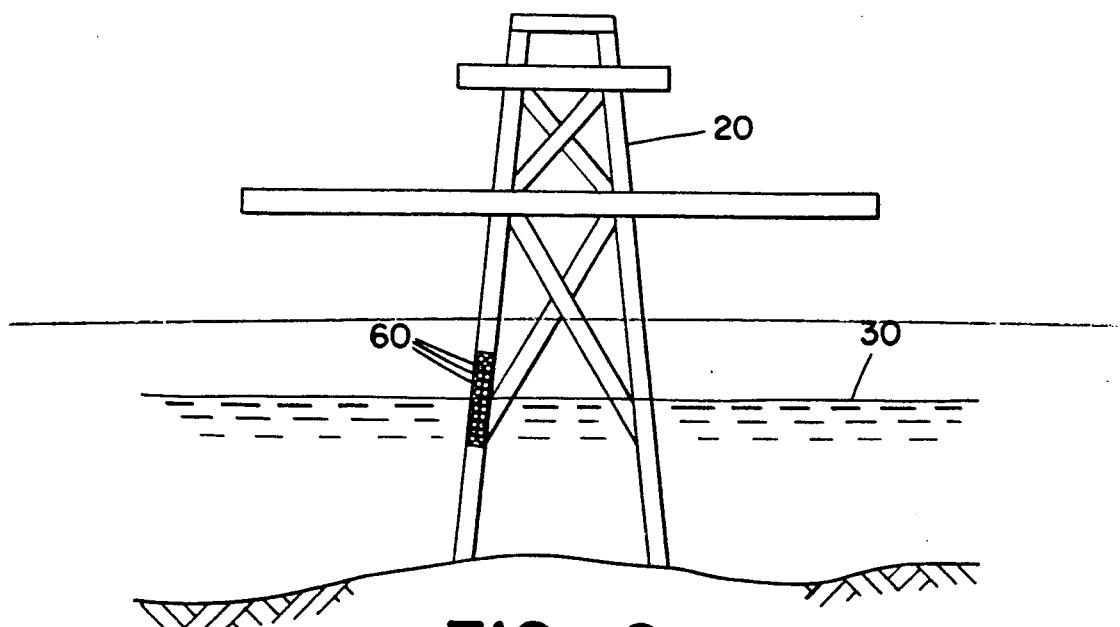
FIG_2

CALIBRATING SATELLITE ALTIMETRY MEASUREMENTS OF GEOIDAL HEIGHT

The present invention relates to calibrating satellite altimetry measurements.

BACKGROUND OF THE INVENTION

Satellite altimetry offers new opportunities for the synergistic use of geophysical measurements that can cover large areas and respond to subsurface conditions. Satellite altimetry data is available over much of the world's oceans. By studying the similarities and differences of potential fields among the regional settings of giant offshore oil fields, we can gain better insight about the nature of those fields that will help us find other fields.

Satellite altimetry is basically the derivation of the geoidal height (proportional to the potential of gravitation) by means of the comparison of two independent measurements. The first measurement is a satellite-derived measurement of the distance between the satellite and the sea surface. The second measurement is a tracking station network-derived measurement of the height of the satellite above the reference ellipsoid. The geoidal height is the difference between those two measurements. It is necessary to correct the satellite-derived measurement for the effects of tides, currents, and weather.

With satellite altimetry, like all other geophysical measurements, there is a need to calibrate those measurements. Software used in satellite altimetry tries to filter noise (wave and wind action) from the satellite signal to get a steady state signal that is fixed by the sea surface. Currently available data have marginal precision with respect to their use in geophysical exploration. The concept described below improves that precision.

SUMMARY OF THE INVENTION

The present invention provides a method of calibrating satellite-altimetry measurements of ocean water height. In that method, two sets of measurements are compared. The first set of measurements is made by using satellite-altimetry during a set time period. The second set of measurements is made by measuring ocean water height against a known reference on a fixed offshore structure during the same time period. The location of the second measurement should be in close proximity to the location of the first measurement.

This concept addresses the problems of the need to examine for accuracy a given set of procedures and techniques designed for performing corrections for tides, currents and weather, and the need for a calibration technique for judging the degree to which a given geoidal height data set is accurate in an absolute sense.

There appear to be two exploitable conditions: (1) the constancy of the component of the measured geoidal height, at a particular location, that is due to subsurface geology, and (2) the tremendous level of redundancy afforded by satellite measurements.

A basic concept of the present invention is to use fixed offshore structures, such as drilling and production platforms, as locations for measuring the absolute height of the ocean surface as a function of time. Two devices described below show the simplicity of this measurement.

One way the ocean water height can be measured is by transmitting a pulse of energy to the sea surface from a known reference point on a fixed offshore structure, receiving the pulse of energy at the known reference point after it has been reflected off the sea surface, and measuring the transit time of that pulse of energy to and from the sea surface. Preferably, the pulse of energy is either laser light or radar.

Another way the ocean water height can be measured is by using water-sensitive sensors placed on the fixed offshore structure at known distances from a known reference point on that structure.

BRIEF DESCRIPTION OF THE DRAWINGS

In order to assist the understanding of this invention, reference will now be made to the appended drawings. The drawings are exemplary only, and should not be construed as limiting the invention.

FIG. 1 shows a schematic drawing of an embodiment using laser or radar measurements.

FIG. 2 shows a schematic drawing of an embodiment using a set of water-sensitive sensors on the structure.

DETAILED DESCRIPTION OF THE INVENTION

In its broadest aspect, the present invention involves a method of calibrating satellite-altimetry measurements of ocean water height. In that method, ocean water height is measured both by using satellite-altimetry and by measuring ocean water height against a known reference on a fixed offshore structure. Then the two sets of measurements are compared.

The measurement against a known reference on the fixed offshore structure provides a known geoidal height which could be compared with the estimated geoidal height derived from satellite-altimetry.

The location of the second measurement should be in close proximity to the location of the first measurement. By this we mean that the two locations are sufficiently close that one can presume that the change in ocean water height between the two locations is less than one centimeter. Normally, the two locations can be up to twenty miles apart. Preferably, the two locations should be within one mile of each other.

Each of the proposed designs would provide instantaneous estimates of ocean surface height with an uncertainty less than one centimeter. This is the level of accuracy required.

The benefits of acquiring exact sea height data during the same period when satellite altimetry data is being acquired are:

1. The "true" value of geoidal height could be determined for the given location with little uncertainty by study and analysis of data over a long period of time.

2. The procedures and techniques used by a geophysical contractor, government agency, or other source of processed data, could be accurately evaluated.

3. An improved method for determining the corrections could be developed by considering several different sets of conditions (tides, currents, and weather).

In one embodiment, the ocean water height is measured against a known reference point on a fixed offshore structure by transmitting a pulse of energy from the known reference point to the sea surface, receiving the pulse of energy at the known reference point after it has been reflected off the sea surface, and measuring the transit time of that pulse of energy to and from the sea surface. Preferably, the pulse of energy is either laser light or radio waves (radar).

Referring to FIG. 1, a transmitter 40 and a receiver 50 is installed at a known position of known actual height on offshore platform 20. A pulse of energy is transmitted from the known reference point to the sea surface 30, then the pulse of energy is reflected from the sea surface 30 back to the known reference point, where it is received by receiver 50.

In another embodiment, the ocean water height is measured against a known reference on a fixed offshore structure by means of water-sensitive sensors placed on the fixed offshore structure at known distances from a known reference point on that structure. By "water-sensitive sensors," we mean sensors that can tell whether or not they are covered with water.

Referring to FIG. 2, a set of sensors 60 is placed on offshore platform 20 at known distances from a known reference point on that platform. Those sensors sense whether or not they are covered by sea water.

While the present invention has been described with reference to specific embodiments, this application is intended to cover those various changes and substitutions that may be made by those skilled in the art without departing from the spirit and scope of the appended claims.

What is claimed is:

1. A method of calibrating satellite-altimetry measurements of ocean water height comprising:
    (a) measuring, at a first location, a first ocean water height by using satellite-altimetry during a time period;
    (b) measuring, at a second location that is in close proximity to the first location, a second ocean water height against a known reference point on a fixed offshore structure during the time period of step (a); and
    (c) comparing the measurements of steps (a) and (b).

2. A method according to claim 1 wherein the second location is within one mile of the first location.

3. A method according to claim 1 wherein the second ocean water height is measured against a known reference point on a fixed offshore structure by:
    (a) transmitting a pulse of energy from the known reference point on the fixed offshore structure to the sea surface;
    (b) receiving the pulse of energy at the known reference point after it has been reflected off the sea surface; and
    (c) measuring the transit time of that pulse of energy to and from the sea surface.

4. A method according to claim 3 wherein the pulse of energy is laser light.

5. A method according to claim 3 wherein the pulse of energy is radar.

6. A method according to claim 1 wherein the ocean water height is measured against a known reference on a fixed offshore structure by means of water-sensitive sensors placed on the fixed offshore structure at known distances from a known reference point on that structure.

* * * * *